Sept. 24, 1957 C. L. ELLIS 2,807,679
AMPLIFIER WITH PLURAL INPUTS AND PARALLEL OUTPUT
Filed Sept. 28, 1954
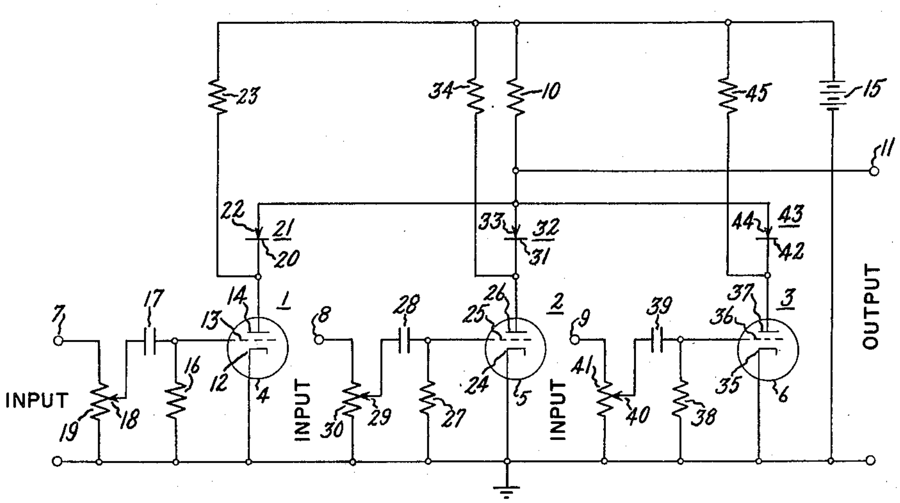
INVENTOR:
CALVIN L. ELLIS,
BY Julius J. Zaskalicky
HIS ATTORNEY United States Patent Office 2,807,679

Patented Sept. 24, 1957

2,807,679

AMPLIFIER WITH PLURAL INPUTS AND PARALLEL OUTPUT

Calvin L. Ellis, North Syracuse, N. Y., assignor to General Electric Company, a corporation of New York Application September 28, 1954, Serial No. 458,803

4 Claims. (Cl. 179—171)

The present invention relates in general to means for combining a plurality of inputs into a common output and has as a particular object thereof to provide such an arrangement which avoids the introduction of stray impedance effects in said output.

It is often desirable to combine a plurality of signals in a common output. One mode of achieving this desired result is by means of a plurality of amplifiers to the input of each of which is applied a respective signal and at the output of which is obtained the combined signal. In such a combination the impedance effects, such an anode to ground capacitance, etc., all appear in shunt across the output of the combination. When a large number of such amplifiers are used to supply a common load, the shunting capacitances become so large as to seriously impair the frequency response characteristics of the combination. Also, a large shunting capacitance across the output necessitates the utilization of a smaller load resistance to insure having a substantially resistive load thereby substantially reducing the gain of the combination. The present invention is directed in its particular aspects to eliminating such undesired effects.

Accordingly, it is another object of the present invention to provide a mixing amplifier having improved gain and frequency response characteristics.

It is also an object of the present invention to provide improvements in combining amplifiers.

In carrying out the present invention in an illustrative embodiment, unilaterally conducting devices are connected in the anode-cathode discharge path of each of the amplifiers of the combination described above and poled to be conductive when a respective electron discharge device is conductive. Each of the unilaterally conducting devices is biased in a manner to become nonconductive when the respective electron discharge device connected in series relation therewith is rendered nonconductive. Thus, only the stray impedance effects, such as anode to ground capacitance, of the amplifier rendered conductive appear across the output of the combination. The stray impedance as of each of the nonconductive amplifiers are in series with the capacitance of the respective reversely biased unilaterally conducting device. Each such series combination has a net capacitance approximately equal to the smaller capacitance. Accordingly, since the capacitances of the reversely biased unilaterally conducting devices are quite small, the net capacitances of the non-conducting devices in shunt with a load are quite small; and consequently they do not appreciably load the output of the combination.

The features of this invention which are believed to be novel are set forth with particularity in the appended claims. The invention itself, however, both as to its organization and method of operation, together with further objects and advantages thereof, may best be understood by reference to the following description when taken in connection with the accompanying drawing wherein is shown a schematic diagram of a circuit arrangement embodying the present invention.

Referring now to the single figure of the drawing, there is shown an illustrative embodiment of the present invention comprising amplifier 1 including electron discharge device 4 having a cathode 12, a grid 13, and an anode 14. The cathode 12 is connected to ground and to the negative terminal of source 15 of unilaterally operating potential. The grid 13 is connected through grid leak resistance 16 to ground and also through coupling capacitor 17 to variable tap 18 of voltage divider 19, the ends of which are connected between the input terminals 7 and ground. The anode 14 is conductively connected to the cathode 20 of unilaterally conducting device 21, the anode 22 of which is conductively connected to one end of output load impedance 10 and output terminal 11, the other end of output load resistance 10 being connected to the positive terminal of source 15. The anode 14 is also connected through a biasing resistance 23 to the positive terminal of source 15.

Amplifier 2 is similar to amplifier 1 and includes an electron discharge device 5 having a cathode 24, a grid 25, and an anode 26. The cathode 24 is connected to ground. The grid 25 is connected to ground through grid leak resistance 27 and through coupling capacitor 28 to tap 29 on voltage divider 30, the ends of which are connected between input terminal 8 and ground. The anode 26 is conductively connected to cathode 31 of unilaterally conducting device 32, the anode 33 of which is conductively connected to output terminal 11. The anode 26 is also connected through biasing load resistance 34 to the positive terminal of source 15.

Amplfiier 3 is similar to amplifiers 1 and 2 and includes electron discharge device 6 including a cathode 35, a grid 36 and an anode 37. The cathode is connected to ground. The grid is connected through grid leak resistance 38 to ground and also through coupling capacitor 39 to tap 40 on voltage divider 41, the ends of which are connected between input terminal 9 and ground. The anode 37 is connected to the cathode 42 of unilaterally conducting device 43, the anode 44 of which is conductively connected to output terminal 11. Anode 37 is also connected through biasing load resistance 45 to the positive terminal of source 15.

In operation, a plurality of signals desired to be combined are individually applied to respective ones of the amplifiers 1, 2, and 3, so as to render one of these amplifiers conductive and thereby cause to appear across the load impedance 10 an amplified output thereof. For example, assume that amplifier 1 has been rendered conductive thereby lowering the potential appearing at the anodes of unilaterally conducting devices 21, 32, and 43. Assume for the time being that the signals applied to amplifiers 2 and 3 are of such a character as to render these amplifiers nonconductive. Accordingly, the anodes of amplifiers 2 and 3 will be higher in potential than the anode of the amplifier 1, and consequently unilaterally conducting devices 32 and 43 will be biased so as to become nonconductive, and thereby disconnecting any stray impedance effects associated with amplifiers 2 and 3 appearing across the output load impedance 10 except for the impedance of devices 32 and 43, respectively. It should be noted that the capacitance between electrodes of these devices is substantially smaller than the capacitance appearing between the anode of electron discharge devices 5 and 6 and ground. Accordingly, the stray capacitances associated with each of the electron discharge devices 5 and 6 will be in series with the capacitance of respective devices 32 and 43, which latter capacitances are very small in comparison to the former capacitances. Accordingly, the shunting capacitance appearing across load 10 will be no greater than the shunting capacitance of the devices 32 and 43. Thus, it is seen that with the provision of the unilaterally conducting devices 21, 32, and 43, the shunting effect of stray impedances associated with nonconducting electron discharge devices is substantially eliminated especially in view of the fact that the shunting capacitance of diodes, which preferably may be germanium diodes, is of the order of one micromicrofarad, whereas the stray capacitance effects associated with the devices 5 and 6 are of the order of twenty or so micromicrofarads.

Preferably, the devices 21, 32, and 43 are devices which have low forward conducting resistance, high back resistance and low capacitance.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim is new and desire to secure by Letters Patent of the United States is:

1. In combination, a plurality of amplifiers each including an electron discharge device having an anode-cathode discharge path, a plurality of unilaterally conducting devices, each of said unilaterally conducting devices having a cathode and an anode, the anode of each of said electron discharge devices being conductively connected to the cathode of a respective one of said unilaterally conducting devices, an output impedance, the anodes of said unilaterally conducting devices being conductively connected together and to one end of said output impedance, means for applying supply potential between the other end of said output impedance and the cathode of each of said electron discharge devices, means for biasing each of said unilaterally conducting devices nonconductive when the respective one of said electron discharge devices connected in series relation therewith is rendered nonconductive.

2. In combination, a plurality of amplifiers each including an electron discharge device having an anode-cathode discharge path, a plurality of unilaterally conducting devices each having a cathode and an anode, an output resistance, the anode of each of said electron discharge devices being conductively connected to a respective one of said cathodes of said unilaterally conducting devices, the anodes of said unilaterally conducting devices being conductively connected together and to one end of said output resistance, means for applying supply potential between the other terminal of said output resistance and the cathodes of said electron discharge devices, means for biasing each of the cathodes of said unilaterally conducting devices at a potential positive with respect to the potential of the anode thereof when the respective electron discharge device is nonconductive.

3. In combination, a plurality of amplifiers each including an electron discharge device having an anode-cathode discharge path, a plurality of unilaterally conducting devices each having a cathode and an anode, an output resistance, the anode of each of said electron discharge devices being conductively connected to a respective one of said cathodes of said unilaterally conducting devices, the anodes of said unilaterally conducting devices being conductively connected together and to one end of said output resistance, means for applying operating potential between the other terminal of said output resistance and the cathodes of said electron discharge devices, means for biasing each of the cathodes of said unilaterally conducting devices at a potential positive with respect to the potential of the anode thereof when the respective electron discharge device is non-conductive, said biasing means including a plurality of biasing resistances each having one end connected to the cathode of a respective one of said unilaterally conducting devices and the other end thereof connected to a point of potential positive with respect to the potential of the anodes of said unilaterally conducting devices when one of said unilaterally conducting devices is conducting.

4. In combination, a plurality of amplifiers each including an electron discharge device having an anode-cathode discharge path, a plurality of unilaterally conducting devices each having a cathode and an anode, an output resistance, the anode of each of said electron discharge devices being conductively connected to a respective one of said cathodes of said unilaterally conducting devices, the anodes of said unilaterally conducting devices being conductively connected together and to one end of said output resistance, means for applying operating potential between the other terminal of said output resistance and the cathodes of said electron discharge devices, means for biasing each of the cathodes of said unilaterally conducting devices at a potential positive with respect to the potential of the anode thereof when the respective electron discharge device is nonconductive, said biasing means including a plurality of biasing resistances each having one end connected to the cathode of a respective one of said unilaterally conducting devices and the other end thereof connected to a point of potential positive with respect to the potential of the anodes of said unilaterally conducting devices when one of said unilaterally conducting devices is conducting, and means for rendering said electron discharge devices individually conducting.

References Cited in the file of this patent

UNITED STATES PATENTS

| | | |
|---|---|---|
| 2,424,893 | Mansford | July 29, 1947 |
| 2,485,665 | Shepherd | Oct. 25, 1949 |
| 2,557,729 | Eckert | June 19, 1951 |
| 2,658,142 | St. John | Nov. 3, 1953 |

OTHER REFERENCES

Artzt article: "Electronics" magazine, August 1945, pages 2–4.